United States Patent
Germano

(10) Patent No.: US 10,393,265 B2
(45) Date of Patent: Aug. 27, 2019

(54) DAMPER FOR PISTON AND PISTON PIN, FOR ICE ENGINES

(71) Applicant: GM GLOBAL TECHNOLOGY OPERATIONS LLC, Detroit, MI (US)

(72) Inventor: Francesco Germano, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 15/786,791

(22) Filed: Oct. 18, 2017

(65) Prior Publication Data

US 2019/0113138 A1    Apr. 18, 2019

(51) Int. Cl.
| | |
|---|---|
| *F16J 1/16* | (2006.01) |
| *F02F 3/00* | (2006.01) |
| *F16F 15/02* | (2006.01) |

(52) U.S. Cl.
CPC .......... *F16J 1/16* (2013.01); *F02F 3/0069* (2013.01); *F16F 15/02* (2013.01)

(58) Field of Classification Search
CPC ..... F16J 1/16; F16J 1/18; F03F 3/0069; F02F 3/0069
USPC .......................................................... 92/187
See application file for complete search history.

(56) References Cited

U.S. PATENT DOCUMENTS

| | | | | |
|---|---|---|---|---|
| 4,406,558 A | * | 9/1983 | Kochendorfer | ............ F16J 1/16 29/888.05 |
| 4,572,058 A | * | 2/1986 | Hinz | ......................... F16J 1/16 123/193.6 |
| 2017/0307082 A1 | * | 10/2017 | Park | ....................... B29C 35/02 |

FOREIGN PATENT DOCUMENTS

JP        2016161062 A    *    9/2016

OTHER PUBLICATIONS

JP 2016161062 A machine translation to English from espacenet. 2016.*

* cited by examiner

*Primary Examiner* — Thomas E Lazo
*Assistant Examiner* — Michael Quandt
(74) *Attorney, Agent, or Firm* — Harness, Dickey & Pierce, P.L.C.

(57) ABSTRACT

A piston pin assembly is provided including a cylindrical pin body having a hollow interior. A mass is disposed in the hollow interior of the cylindrical pin body and a viscoelastic, plastic, or elastomeric material is disposed in the hollow interior between the mass and the cylindrical pin body. The mass and viscoelastic, plastic, and elastomeric material provides a damper for the piston and piston pin to delay the acceleration of piston lateral motion and stabilize the piston rotation and reduce the noise and friction.

16 Claims, 2 Drawing Sheets

DAMPER FOR PISTON AND PISTON PIN, FOR ICE ENGINES

FIELD

The present disclosure relates to a damper for a piston and piston pin for internal combustion engines.

BACKGROUND

This section provides background information related to the present disclosure which is not necessarily prior art.

Internal combustion engines are exposed to many forces. As a piston reciprocates within the cylinder, it transmits rotational force to the crankshaft via a connecting rod that is connected to the piston by a piston pin. While the piston is reciprocating, the walls of the cylinder resist rotational and lateral motion of the piston. The larger the rotational and lateral forces, the more friction and energy dissipation that decreases the engine's efficiency and increases the engines noise and vibration. Accordingly, it is desirable to reduce the piston rotational motion along the cylinder block and delay the acceleration of the piston lateral motion in order to reduce the engines noise and friction.

SUMMARY

This section provides a general summary of the disclosure, and is not a comprehensive disclosure of its full scope or all of its features.

The present disclosure provides a damper for the piston and piston pin to delay the acceleration of piston lateral motion and stabilize the piston rotation and reduce the noise and friction. A piston pin assembly is provided including a cylindrical pin body having a hollow interior. A mass is disposed in the hollow interior of the cylindrical pin body and a viscoelastic material is disposed in the hollow interior between the mass and the cylindrical pin body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
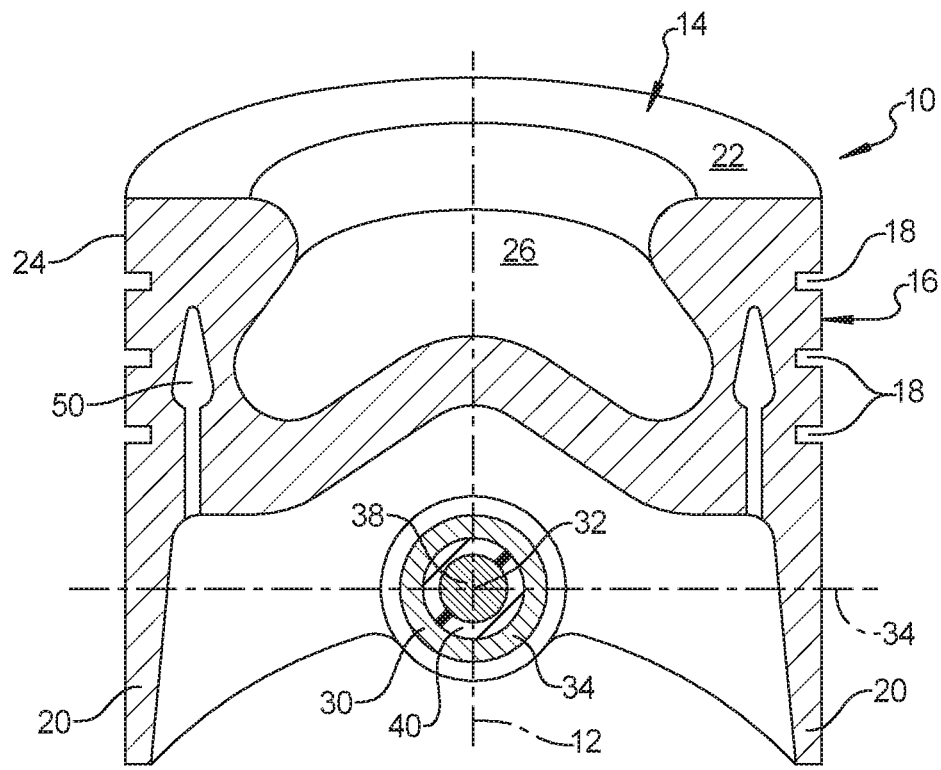
FIG. 1 is a cross-sectional perspective view of a piston assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring first to FIG. 1 of the drawings, a cross sectional view of a piston 10 which is adapted to be reciprocatingly received in a cylinder along a central axis 12, as is known in the art. The piston 10 generally has a cylindrical shape centered on the axis 12 and includes a crown 14, a ring belt 16 with piston ring grooves 18 and one or more skirts 20 extending axially from the ring belt 16. The skirts 20 are extended generally along thrust sides of the piston. The crown 14 has a generally planar upper surface 22 (that can optionally include valve pockets) extending inward from a side wall 24 and generally defining the top of the piston 10. The crown 14 can include a combustion bowl 26 extending downward from the planar surface 22. As is known in the art, the piston 10 is supported by a piston pin assembly 30 that connects the piston 10 to a connecting rod (not shown). The piston pin 30 has a piston pin axis 32 optionally not intersecting the piston longitudinal axis 12. A thrust/anti-thrust axis 34 is perpendicular to the piston pin axis 32.

Figure 2:
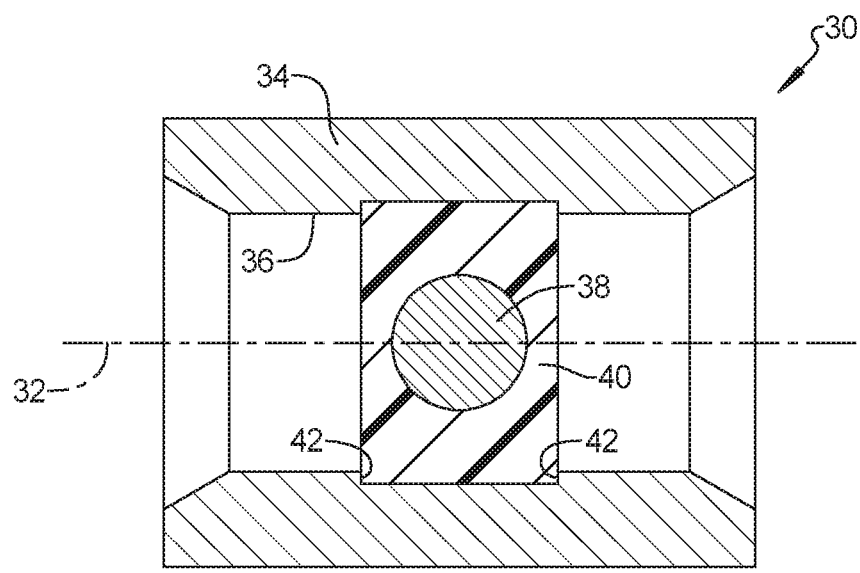
FIG. 2 is a cross-sectional view of the piston pin assembly of FIG. 1.

With reference to FIG. 2, a cross-sectional view of an exemplary piston pin assembly 30 according to the principles of the present disclosure will now be described. The piston pin assembly 30 includes a cylindrical pin body 34 having a hollow interior 36. A mass 38 is disposed in the hollow interior 36 of the cylindrical pin body 34. The mass 38 is supported in the hollow interior 36 by a viscoelastic material 40 that can encapsulate the mass 38 within the hollow interior 36, as shown in the cross-sectional views of FIGS. 1 and 2. The viscoelastic material 40 can be disposed between a pair of shoulders 42. The mass 38 can be spherical in shape, as shown in FIGS. 1 and 2, or alternatively can have other shapes. The mass 38 can be made by metal or other high density material. Exemplary viscoelastic material 40 can include hard (with high stiffness) viscoelastic materials or soft (with high viscosity) viscoelastic materials. For the hard (with high stiffness) viscoelastic materials can also include plastic material like: Polyether ether ketone (PEEK by ASTM D6262): thermoplastic organic polymer or other polymer of the family of Polyaryletherketone (PAEK by ASTM D6262). PAEK is a family of semi-crystalline thermoplastics with high-temperature stability and high mechanical strength. The viscoelastic material 40 can also include PAEK with optionally carbon fibers, graphite, Polytetrafluoroethylene, glass fiber, metallic inclusions. For the soft (with high viscosity) viscoelastic materials, the viscoelastic material 40 can also include: elastomer materials like: rubbers as fluorocarbon rubber, silicone rubber (VMQ by ASTM D1418 standard and ISO/DIN 1629 standard), fluorosilicone rubber (FVMQ by ASTM D1418 standard and ISO/DIN 1629 standard), fluorocarbon rubber (FKM by ASTM D1418 standard—equivalent to FPM by ISO/DIN 1629 standard), and in particular perfluoro-elastomers (FFKM by ASTM 1418 standard—equivalent to FFPM by ISO/DIN 1629 standard) and tetrafluoro ethylene/propylene rubbers (FEPM or TFE/P by ASTM 1418 standard—FEPM by ISO/DIN 1629 standard).

Figure 3:
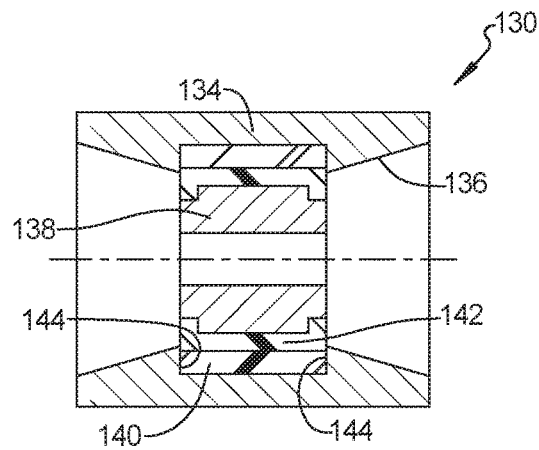
FIG. 3 is a cross sectional view of an alternative piston pin assembly according to the principles of the present disclosure.
Figure 4:
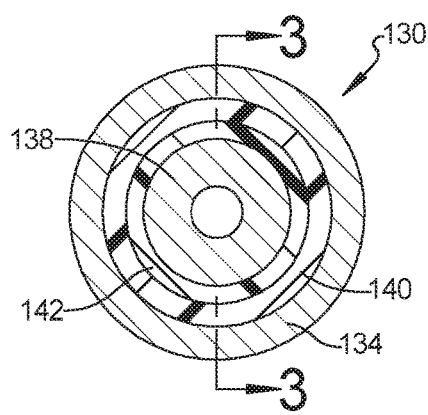
FIG. 4 is an end plan view of the piston pin assembly of FIG. 3.

As an alternative embodiment, as shown in FIGS. 3 and 4, a piston pin assembly 130 includes a cylindrical pin body 134 having a hollow interior 136 that can be optionally tapered. A mass 138 is disposed in the hollow interior 136 of the cylindrical pin body 134. The mass 138 can be optionally hollowed cylindrical, can be disposed between opposing internal shoulders 144 and is supported by the cylindrical layer of relatively soft viscoelastic material 142 such as elastomer materials like: rubbers as fluorocarbon rubber, silicone rubber (VMQ by ASTM D1418 standard and ISO/DIN 1629 standard), fluorosilicone rubber (FVMQ by ASTM D1418 standard and ISO/DIN 1629 standard), fluorocarbon rubber (FKM by ASTM D1418 standard—equivalent to FPM by ISO/DIN 1629 standard), and in particular perfluoro-elastomers (FFKM by ASTM 1418 standard—equivalent to FFPM by ISO/DIN 1629 standard) and tetrafluoro ethylene/propylene rubbers (FEPM or TFE/P by ASTM 1418 standard—FEPM by ISO/DIN 1629 standard). The relatively soft viscoelastic material 142 is supported by a cylindrical layer of relatively hard viscoelastic material 140, such as plastic materials like: Polyether ether ketone (PEEK by ASTM D6262): thermoplastic organic polymer or other polymer of the family of Polyaryletherketone (PAEK by ASTM D6262). PAEK is a family of semi-crystalline thermoplastics with high-temperature stability and high mechanical strength. The viscoelastic material 40 can also include PAEK with optionally carbon fibers, graphite, Polytetrafluoroethylene, glass fiber, metallic inclusions. This cylindrical layer of relatively hard viscoelastic material 140 can be disposed in a slot/cavity within the cylindrical pin body 134. The soft viscoelastic material layer 142 and the tapered hollow interior 136 can help in the manufacturing and assembly of piston pin damper, and let the pressfit inside the pin of the damper viscoplastic material layers 140, 142 and damper mass 138.

Figure 5:
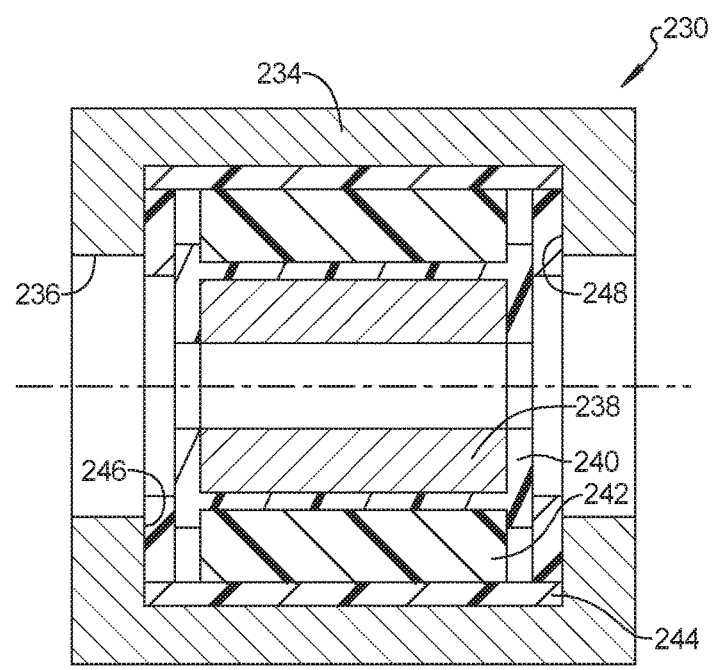
FIG. 5 is a cross sectional view of a further alternative piston pin assembly according to the principles of the present disclosure.

As a further alternative embodiment, as shown in FIG. 5, a piston pin assembly 230 includes a cylindrical pin body 234 having a hollow interior 236. A mass 238 is disposed in the hollow interior 236 of the cylindrical pin body 234. The mass 238 is supported by a cylindrical layer of relatively hard viscoelastic (or viscoplastic) material 240 such as plastic materials like: Polyether ether ketone (PEEK by ASTM D6262): thermoplastic organic polymer or other polymer of the family of Polyaryletherketone (PAEK by ASTM D6262). PAEK is a family of semi-crystalline thermoplastics with high-temperature stability and high mechanical strength. The viscoelastic material 40 can also include PAEK with optionally carbon fibers, graphite, Polytetrafluoroethylene, glass fiber, metallic inclusions. The relatively hard viscoelastic material 240 is supported by a cylindrical layer of relatively soft viscoelastic material 242 such as elastomer materials like: rubbers as fluorocarbon rubber, silicone rubber (VMQ by ASTM D1418 standard and ISO/DIN 1629 standard), fluorosilicone rubber (FVMQ by ASTM D1418 standard and ISO/DIN 1629 standard), fluorocarbon rubber (FKM by ASTM D1418 standard—equivalent to FPM by ISO/DIN 1629 standard), and in particular perfluoro-elastomers (FFKM by ASTM 1418 standard—equivalent to FFPM by ISO/DIN 1629 standard) and tetrafluoro ethylene/propylene rubbers (FEPM or TFE/P by ASTM 1418 standard—FEPM by ISO/DIN 1629 standard). The cylindrical layer of relatively soft viscoelastic material 242 can be further supported by an additional cylindrical layer of relatively hard viscoelastic material 244 disposed between opposing internal shoulders 246 within the cylindrical body 234.

In each of the above embodiments, the mass and viscoelastic elastomeric materials act as a spring and damper system to delay the accelerator of the piston lateral motion, stabilize the piston rotation and reduce the noise and friction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A piston pin assembly, comprising:
a cylindrical pin body having a hollow interior;
a mass disposed in the hollow interior of the cylindrical pin body;
one of a viscoelastic, plastic, or elastomeric material without oriented fiber reinforcement disposed in the hollow interior between the mass and the cylindrical pin body, such that the mass and the one of a viscoelastic, plastic, or elastomeric material act as a mass and spring damper mechanism, wherein the cylindrical pin body includes a pair of interior shoulders on opposite sides of the elastomeric material.

2. The piston pin assembly according to claim 1, wherein the mass is cylindrical in shape.

3. The piston pin assembly according to claim 1, wherein the mass is made from metal.

4. A piston pin assembly, comprising:
a cylindrical pin body having a hollow interior;
a mass disposed in the hollow interior of the cylindrical pin body;
one of a viscoelastic, plastic, or elastomeric material disposed in the hollow interior between the mass and the cylindrical pin body; and
wherein the mass is spherical in shape.

5. A piston pin assembly, comprising:
a cylindrical pin body having a hollow interior;
a mass disposed in the hollow interior of the cylindrical pin body;
one of a viscoelastic, plastic, or elastomeric material without oriented fiber reinforcement disposed in the hollow interior between the mass and the cylindrical pin body, such that the mass and the one of a viscoelastic, plastic, or elastomeric material act as a mass and spring damper mechanism, wherein the elastomeric material includes a first layer of one of a viscoelastic, plastic, or elastomeric material and a second layer of viscoelastic, plastic, or elastomeric material, wherein the second layer of viscoelastic, plastic, or elastomeric material is softer than the first layer of one of a viscoelastic, plastic, or elastomeric material.

6. The piston pin assembly according to claim 5, wherein the second layer of one of a viscoelastic, plastic, or elastomeric material is disposed between the mass and the first layer of one of a viscoelastic, plastic, or elastomeric material.

7. The piston pin assembly according to claim 5, wherein the second layer of one of a viscoelastic, plastic, or elastomeric material is disposed between the cylindrical pin body and the first layer of one of a viscoelastic, plastic, or elastomeric material.

8. A piston pin assembly, comprising:
a cylindrical pin body having a hollow interior;
a mass disposed in the hollow interior of the cylindrical pin body;
one of a viscoelastic, plastic, or elastomeric material disposed in the hollow interior between the mass and the cylindrical pin body; and
wherein the one of a viscoelastic, plastic, or elastomeric material includes a first layer of one of a viscoelastic, plastic, or elastomeric material, a second layer of one of a viscoelastic, plastic, or elastomeric material and a third layer of one of a viscoelastic, plastic, or elastomeric material, wherein the second layer of one of a viscoelastic, plastic, or elastomeric material is disposed between the first and second layers of one of a viscoelastic, plastic, or elastomeric material and the second layer of one of a viscoelastic, plastic, or elastomeric material is relatively softer than the first and third layers of one of a viscoelastic, plastic, or elastomeric material.

9. A piston assembly, comprising:
a piston body having a crown and a skirt extending from the crown; and
a piston pin assembly including a cylindrical body having a hollow interior, a mass disposed in the hollow interior of the cylindrical body, and one of a viscoelastic, plastic, or elastomeric material without oriented fiber reinforcement disposed in the hollow interior between the mass and the cylindrical body, such that the mass and the one of a viscoelastic, plastic, or elastomeric material act as a mass and spring damper mechanism, wherein the cylindrical pin body includes a pair of interior shoulder on opposite sides of the one of a viscoelastic, plastic, or elastomeric material.

10. The piston assembly according to claim 9, wherein the mass is cylindrical in shape.

11. The piston assembly according to claim 9, wherein the mass is made by metal.

12. A piston assembly, comprising:
a piston body having a crown and a skirt extending from the crown; and
a piston pin assembly including a cylindrical body having a hollow interior, a mass disposed in the hollow interior of the cylindrical body, and one of a viscoelastic, plastic, or elastomeric material disposed in the hollow interior between the mass and the cylindrical body; and
wherein the mass is spherical in shape, wherein the cylindrical pin body includes a pair of interior shoulders on opposite sides of the one of a viscoelastic, plastic, or elastomeric material.

13. A piston assembly, comprising:
a piston body having a crown and a skirt extending from the crown; and
a piston pin assembly including a cylindrical body having a hollow interior, a mass disposed in the hollow interior of the cylindrical body, and one of a viscoelastic, plastic, or elastomeric material disposed in the hollow interior between the mass and the cylindrical body; and
wherein the mass is spherical in shape, wherein the one of a viscoelastic, plastic, or elastomeric material includes a first layer of one of a viscoelastic, plastic, or elastomeric material and a second layer of one of a viscoelastic, plastic, or elastomeric material, wherein the first layer of one of a viscoelastic, plastic, or elastomeric material is softer than the second layer of one of a viscoelastic, plastic, or elastomeric material.

14. The piston assembly according to claim 13, wherein the second layer of one of a viscoelastic, plastic, or elastomeric material is disposed between the mass and the first layer of one of a viscoelastic, plastic, or elastomeric material.

15. The piston assembly according to claim 13, wherein the second layer of one of a viscoelastic, plastic, or elastomeric material is disposed between the cylindrical pin body and the first layer of one of a viscoelastic, plastic, or elastomeric material.

16. A piston assembly, comprising:
a piston body having a crown and a skirt extending from the crown; and
a piston pin assembly including a cylindrical body having a hollow interior, a mass disposed in the hollow interior of the cylindrical body, and one of a viscoelastic, plastic, or elastomeric material disposed in the hollow interior between the mass and the cylindrical body; and
wherein the elastomeric material includes a first layer of one of a viscoelastic, plastic, or elastomeric material, a second layer of one of a viscoelastic, plastic, or elastomeric material and a third layer of one of a viscoelastic, plastic, or elastomeric material, wherein the second layer of one of a viscoelastic, plastic, or elastomeric material is disposed between the first and second layers of one of a viscoelastic, plastic, or elastomeric material and the second layer of one of a viscoelastic, plastic, or elastomeric material is relatively softer than the first and third layers of one of a viscoelastic, plastic, or elastomeric material.

* * * * *